Figure 1:
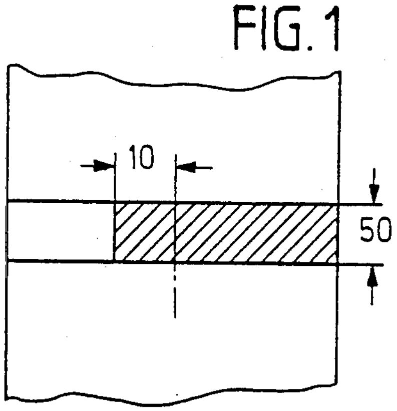

United States Patent [19]

Pohrt et al.

[11] Patent Number: 4,647,621

[45] Date of Patent: Mar. 3, 1987

[54] THERMOPLASTIC MOLDING MATERIAL

[75] Inventors: Juergen Pohrt, Mannheim; Ruediger Matern, Ilvesheim; Helmut Jenne, Schriesheim; Hermann Gausepohl, Mutterstadt; Karl Gerberding, Wachenheim, all of Fed. Rep. of Germany

[73] Assignee: BASF Aktiengesellschaft, Ludwigshafen, Fed. Rep. of Germany

[21] Appl. No.: 625,689

[22] Filed: Jun. 28, 1984

Related U.S. Application Data

[63] Continuation-in-part of Ser. No. 475,728, Mar. 16, 1983, abandoned.

[30] Foreign Application Priority Data

Mar. 17, 1982 [DE] Fed. Rep. of Germany ....... 3209624

[51] Int. Cl.$^4$ .......................... C08L 5/00; C08L 5/04

[52] U.S. Cl. ........................................ 525/71; 525/68; 525/91; 525/905

[58] Field of Search .......................................... 525/71

[56] References Cited

U.S. PATENT DOCUMENTS

| | | | |
|---|---|---|---|
| 4,075,285 | 2/1978 | Tabana et al. | 525/92 |
| 4,214,056 | 7/1980 | Lavengood | 525/71 |
| 4,256,853 | 3/1981 | Naylor et al. | 525/71 |
| 4,386,125 | 5/1983 | Shiraki et al. | 525/71 |

FOREIGN PATENT DOCUMENTS

| | | | |
|---|---|---|---|
| 3035637 | 5/1982 | Fed. Rep. of Germany | 525/92 |
| 3049186 | 7/1982 | Fed. Rep. of Germany | 525/92 |

*Primary Examiner*—Jacob Ziegler

*Attorney, Agent, or Firm*—Keil & Weinkauf

[57] ABSTRACT

A thermoplastic molding material comprises copolymers I and II.

Copolymer I is a high-impact (graft) copolymer which is derived from a monovinyl-aromatic monomer and a polymer or copolymer predominantly containing polymerized 1,3-diene units, and is present in a proportion of 0.1–1.0% by weight, based on the molding material.

Copolymer II is a block copolymer with star-shaped branching, ie. a radial block copolymer, having an average of more than two branches per molecule. It is substantially derived from 55–80% by weight of a monovinyl-aromatic monomer and 20–45% by weight of a 1,3-diene monomer.

The molding material may contain conventional assistants and is used for the production of blown film.

8 Claims, 2 Drawing Figures

THERMOPLASTIC MOLDING MATERIAL

This application is a continuation-in-part of U.S. patent application Ser. No. 475,728, filed Mar. 16, 1983, now abandoned.

The present invention relates to a thermoplastic molding material which comprises a mixture of rubber-modified polymers of vinyl-aromatics (namely high-impact polystyrene) and a branched block copolymer of styrene and butadiene.

The relevant prior art includes:

(1) U.S. Pat. No. 4,075,285, (2) German patent application No. P. 30 49 186 and (3) German patent application No. P 30 35 637.

Reference (1) discloses mixtures of linear 3-block copolymers of the ABA type and high-impact polystyrene. Reference (2) and especially reference (3) describe molding materials comprising radial block copolymers and high-impact polystyrene.

It is an object of the present invention to improve the physical properties of the conventional molding materials, for example the impact strength in the case of the products described in (1), or to provide transparent molding materials having good mechanical properties [cf. (3)].

It is known that block copolymers (whether linear or radial), when used to produce tubular film, tend to exhibit blocking as the film is drawn off; this behavior is also shown by other plastics, such as polyethylene or PVC. To reduce this blocking, it has been proposed to employ anti-blocking agents in the plastics mentioned, eg. polyethylene or PVC; small amounts of these agents are added to the plastics.

The anti-blocking agents are, for example, organic assistants, such as lubricants (amide waxes), acid amides (for example amides of stearic acid and erucic acid) or inorganic materials, which are used in a finely divided form (for example silica gel, calcium carbonates, silicas and aluminum silicates).

The conventional anti-blocking additives, when mixed with glass-clear block copolymers, cause a worsening of the mechanical properties (in the case of organic anti-blocking agents) and/or a loss of transparency (for example in the case of inorganic anti-blocking agents).

It is accordingly a further object of the invention to propose an anti-blocking agent suitable for branched styrene/butadiene block copolymers, which does not adversely affect either the mechanical or the optical properties of the material.

We have found that the objects of the invention are achieved by providing the molding material according to claim 1.

The components of the molding material, the molding material itself and its preparation are described below.

Component I

Component I of the novel molding materials, ie. the high-impact polystyrene, in which the rubber used is preferably a crosslinked polybutadiene, is employed in an amount of from 0.1 to 1.0% by weight, preferably from 0.1 to 0.5% by weight, especially from 0.2 to 0.4% by weight, based on I and II.

The exact amount of component I to be employed depends on the mean particle size of the soft component a2 and on the rubber content of component I. For mean particle sizes of, for example, 5–10 μm and rubber contents of 7–9% by weight, it is only necessary to use, for example, 0.2–0.4% by weight of component I. In high-impact products with a smaller mean particle size, a higher proportion of component I is needed to prevent blocking. For a given mean particle size and a given rubber content, a skilled worker can determine the required amount by means of a few exploratory experiments.

The preparation of high-impact polystyrene is known. Any high-impact product prepared by a conventional process may be used in preparing the molding material according to the invention.

Such a high-impact polystyrene is made up of a soft component embedded and finely expersed in polystyrene as the matrix. The soft component is obtained by polymerization of a rubber in the presence of e.g. styrene and therefore constitutes a graft copolymer of e.g. styrene on the rubber as the grafting base.

The mean (number-average) particle size of the soft component can be from 0.3 to 15 μm, especially from 1 to 12 μm, preferably from 2.5 to 9 μm.

Employing the above particle sizes, the rubber content may be from 2 to 18% by weight, especially from 4.5 to 9% by weight, based on component I.

Suitable vinyl-aromatic monomers (a1) for the preparation of component I are, in particular, styrene, p-methylstyrene, α-methylstyrene, 2,4-dimethylstyrene and tert.-butylstyrene. Small amounts of acrylonitrile may also be present. Preferably, however, styrene or p-methylstyrene is used, by itself or as a mixture.

The (co)polymer (a2) in component I of the novel molding material contains, as polymerized units, more than 50% by weight, preferably more may have a medium or high cis-content. Mixtures of butadiene and isoprene may also be used, though butadiene is preferred. Rubbers of natural origin, and the conventional EPDM-based rubbers, may also be employed.

Component I of the novel molding material can be prepared by continuous polymerization in the presence of the rubber in two or more reaction zones. Processes for this purpose are described in U.S. Pat. Nos. 3,243,481 and 3,903,202. However, it is particularly preferred to prepare component I of the novel molding material by the process described in U.S. Pat. Nos. 3,658,926 or 4,086,298. The numerous commercially available high-impact polystyrenes containing crosslinked or non-crosslinked soft components may also be employed.

Component II

Component II of the molding material according to the invention comprises one or more star-shaped branched block copolymers with an average of more than two branches, these block copolymers being based essentially on one or more vinyl-aromatic monomers, preferably styrene, and one or more 1,3-dienes; butadiene is preferred to isoprene or to isoprene/butadiene mixtures. Component II of the molding material is used in an amount of from 99.9 to 99.0% by weight, advantageously from 99.9 to 99.5% by weight and more especially from 99.85 to 99.6% by weight, based on I+II. Component II of the novel molding material contains from 55 to 80% by weight, preferably from 70 to 80% by weight, of monomer units (b1), and from 20 to 45% by weight, especially from 30 to 20% by weight, of monomer units (b2).

The said monomer units (b1) and (b2) each constitute at least one polymer segment consisting solely of the respective units. Moreover, there may be present one or more polymer segments composed of both types of monomer units simultaneously.

Suitable vinyl-aromatic monomers (b1) on which the polymer segments may be based are, in particular, styrene, p-methylstyrene, sidechain-alkylated styrenes, eg. $\alpha$-methylstyrene, and nuclear-substituted styrenes, eg. vinyltoluene or ethylvinylbenzene. Styrene and p-methylstyrene are particularly preferred.

The conjugated dienes (b2) on which the other polymer segments are based are of 4 to 8 carbon atoms, and may be individual dienes or mixtures of dienes. Butadiene and isoprene are preferred, the former more especially. These remarks apply to the segments of all the polymers.

The star-shaped branched block copolymer II is prepared by methods known per se, employing anionic polymerization with a lithium-organic compound as the initiator. In the simplest case, where there are only 2 polymer segments present in each branch, the block copolymer may be represented by the general formula $$(A-B)_x-Y$$

or $$(B-A)_x-Y,$$

where x has a mean value which is greater than 2 and not greater than 4, or may be a mixture of both types.

In the formula, A is a polymer segment which essentially consists of vinyl-aromatic monomer units, whereas B is a polymer segment which essentially consists of 1,3-dienes as monomer units. The general formula merely expresses the fact that both butadienyl and styrl ends may be bonded to the coupling center Y. As regards the structure of the linear side branches of the branched block copolymer, there are various possibilities, namely that the coupled end product may be prepared from linear two-block or three-block or multiblock copolymers or mixtures of these. Coupling results in the known branched block copolymers which as a rule—since coupling does not proceed quantitatively—are a complicated mixture of linear and star-shaped branched copolymers with different proportions of star branches.

The above formula is also intended to include the polymodal block copolymers. Accordingly, polymodal branched block copolymers having essentially the following structure $$(A^1-A^2-B)_n-X-(B-A_2)_m$$

where m is 1, 2 or 3 and so on, m+n is ≧2, preferably 3 or 4, and n is 1, 2, 3 and so on, may be used successfully in the novel molding material. Such block copolymers can readily be obtained by anionic polymerization, using the process described in U.S. Pat. No. 3,639,517.

The branched, polymodal block copolymers obtainable by the process described in Canadian Pat. No. 1,087,339 may essentially be represented by the following formula $$(A^1-A^2\rightarrow B)_n-X-(A^3\leftarrow B-A^2)_m$$

where m is 1, 2, 3 and so on, m+n is ≧2, preferably 3 or 4, and n is 1, 2, 3 and so on, and are also a preferred component II for use in the novel molding material, as are the polymodal branched block copolymers of the formula $$(A^1-B\rightarrow A^2)_n-X-(A^2\leftarrow B)_m.$$

The preparation of such block copolymers is described in U.S. Pat. No. 4,086,298.

In all the block copolymers described above, $A^1$, $A^2$ and $A^3$ are non-elastomeric polymer segments based on one or more monovinyl-aromatic monomers. The molecular weights of the polymer segments are intended in each case to have the values given by way of examples, or stated to be preferred, in the publications mentioned.

In all the block copolymers employed according to the invention, B is an elastomeric polymer segment based on one or more conjugated dienes. In the branched polymodal block copolymers to be used according to the invention, n and m are running terms, m being equal to or greater than n, and the sum of m+n being ≧2 and preferably equal to 3 or 4. X is the radical of the polyfunctional coupling agent. The copolymer chains which form the branches are chemically bonded via this radical to form the star-shaped branched block copolymers. Suitable coupling agents are the compounds described in the publications mentioned. In the structural formulae given, A-B indicates a sharp transition, and A→B an ill-defined transition, between the individual polymer segments. B may moreover be a random butadiene/styrene copolymer block, in which butadiene units predominate.

The block copolymers having the above structures which are used in the novel molding material may be employed individually or as mixtures with one another.

The block copolymers described in U.S. Pat. Nos. 4,248,980 and 4,248,984 may also be used as component II.

Component III

The novel molding material may or may not contain conventional additives as component III. Suitable additives include conventional stabilizers, lubricants, mold release agents, fillers, colored pigments, antistatic agents and the like. The novel molding materials may also be flameproofed by means of the conventional bromine-containing and/or chlorine-containing organic compounds together with effective amounts of conventional synergistic agents.

The novel molding material may be prepared, and any additives used may be incorporated, by suitable conventional mixing methods, for example in extruders, kneaders or mills, or by mixing solutions and then removing the solvent.

To produce films and sheets, the novel molding material is extruded through annular dies or slot dies, or is calendered, the first two methods being preferred.

The films and sheets produced by the preferred method may be employed for a great variety of uses, especially for packaging foodstuffs intended to be stored at low temperatures. By blending the novel molding material with standard polystyrene, polyphenylene oxide and/or styrene/butadiene block copolymers or other polymeric additives, films and sheets possessing excellent transparency, good tensile strength and very high surface gloss may be obtained.

The products shown below were used in the examples:

As component I, the products prepared according to the following publications were employed:

Product A, according to Canadian Pat. No. 1,114,984, with a rubber content of 8% and a mean particle size of less than 1 $\mu$m.

Product B, according to U.S. Pat. No. 3,658,926, with a rubber content of 8% and a mean particle size of 3.5 μm.

Product C, according to U.S. Pat. No. 4,144,204, with a rubber content of 8% and a mean particle size of 8 μm.

As component II, the products prepared according to the following publications were employed:

Product D, according to U.S. Pat. No. 3,639,517, Example I.

Product E as taught in U.S. Pat. No. 4,086,298, but with admixture of 10% of standard polystyrene.

Demonstration of the anti-blocking action of the novel high-impact polystyrene when added to styrene/butadiene block copolymers Mixtures of granules of styrene/butadiene block copolymers and granules of high-impact polystyrene were prepared. These were extruded through an annular die to produce tubular films. The tubes were laid flat by means of a roller, giving a double film whose faces adhere to one another, constituting the phenomenon known as blocking. The adhesion was quantified by measuring the tensile forces needed to separate the film faces which were in contact.

The tubular films were produced on a 60 mm/25 D extruder with grooved intake bush. The temperature of the material before entering the die was from 205° to 210° C. The throughput was 96 kg/h and the take-off speed was about 14 m/min. Using a blow-up ratio of 1:1.75, the tubular film obtained was 100 μm-120 μm thick, depending on the mixture.

Tensile test

Figure 2:
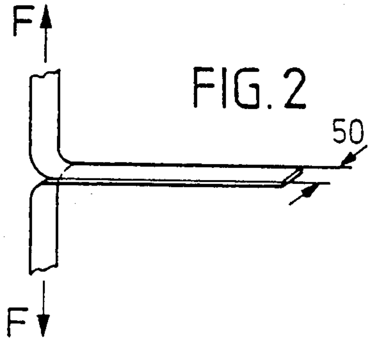

Double test strips of 50 mm width were cut out of the layflat tubing, crosswise to the extrusion direction, as shown in FIG. 1. These double strips were folded open at one end, so that two arms for clamping in the jaws of a tensile tester were formed, as shown in FIG. 2. The lengths of these arms were such that in the part of the strip which was left blocked there remained a distance of 10 mm to the center of the tubular film; this was done in order to determine the maximum blocking which was to be expected at the center; on the other hand, experience has shown that due to outward compression of the air during passage of the film through the rollers, the surfaces near the sides of the tubular film block less strongly.

The tensile test was carried out with a jaw speed of 100 mm/min, and the tensile forces were recorded graphically over the length of travel of the strip being opened.

The mean band widths of the tensile forces for all experimental settings are shown in Table 1 and are based on 5-10 individual measurements. The data are in Newtons.

Comparison with the initial value of the tensile force required for D and E (Comparative Experiments 19 and 20) shows that the mixtures containing standard polystyrene (Comparative Experiments 21, 22 and 23) exhibit no antiblocking action. The same is true for the mixtures of D and E with A (a high-impact polystyrene containing very small rubber particles), as shown in Examples 1, 4, 9 and 13. Product B, with a larger average particle size than A, shows an anti-blocking action when added in amounts of 0.2% by weight upwards to E (Example 6). Product C on the other hand, which has a larger average particle size than either B or A, produces, in amounts of 0.2% by weight, an antiblocking action for all components II (ie. product D and product E), cf. Examples 7 and 8.

TABLE 1

| | Component I | | Component II | | Tensile |
|---|---|---|---|---|---|
| Example | Product | % by weight | Product | % by weight | force in [N] |
| 1 | A | 0.1 | E | 99.9 | 0.15-0.20 |
| 2 | B | 0.1 | E | 99.9 | 0.15-0.20 |
| 3 | C | 0.1 | E | 99.9 | 0.12-0.15 |
| 4 | A | 0.2 | D | 99.8 | 0.30-0.50 |
| 5 | B | 0.2 | D | 99.8 | 0.60-0.80 |
| 6 | B | 0.2 | E | 99.8 | non-blocking |
| 7 | C | 0.2 | D | 99.8 | non-blocking |
| 8 | C | 0.2 | E | 99.8 | non-blocking |
| 9 | A | 0.5 | D | 99.5 | 0.20-0.30 |
| 10 | B | 0.5 | D | 99.5 | 0.15-0.25 |
| 11 | C | 0.5 | D | 99.5 | non-blocking |
| 12 | C | 0.5 | E | 99.5 | non-blocking |
| 13 | A | 1.0 | D | 99.0 | 0.15-0.20 |
| 14 | B | 1.0 | D | 99.0 | non-blocking |
| 15 | B | 1.0 | E | 99.0 | non-blocking |
| 16 | C | 1.0 | D | 99.0 | non-blocking |
| 17 | C | 1.0 | E | 99.0 | non-blocking |
| 18 | B | 2.0 | E | 98.0 | non-blocking |
| Comparative experiments | Standard polystyrene % by weight | | | | |
| 19 | 0 | | D | 100 | 0.80-1.00 |
| 20 | 0 | | E | 100 | 0.15-0.20 |
| 21 | 10 | | D | 90 | 0.40-0.60 |
| 22 | 20 | | D | 80 | 1.40-1.60 |
| 23 | 30 | | E | 70 | 0.15-0.20 |

Determination of the gloss of the films

The gloss of the films was determined by means of a GP2 goniophotometer from Zeiss.

A sample (size about 4×5 cm) is placed horizontally and flat, without using a clamping device, on a black velvet base and is illuminated with quasi-parallel light (from a filament lamp) at an angle of 60° (aperture angle 0.5°) to the plane vertical to the sample. The light reflected in an angular range of from 50° to 70° (aperture angle 0.5°) to the said normal plane is recorded.

The parameters determined were the gloss G, and the one-third width DB of the films, using the following equations.

$$G = 100 \times G(\text{sample})/G(\text{black glass standard}) \quad (1)$$

$G$(sample) = maximum of the goniophotometer curve of the sample (=reflection at the glancing angle)

$G$(black glass standard) = maximum of the goniophotometer curve of the black glass standard $$DB = DB(\text{sample})/DB(\text{black glass standard}) \quad (2)$$

$DB$(sample) = width of the goniophotometer curve at one-third of the gloss maximum (one-third width) of the sample $DB$(black glass standard) = one-third width of the black glass standard The gloss of the sample increases with increasing G and with decreasing DB.

The results of the measurements are shown in Table 2.

TABLE 2

| No. | Component I | | G [%] | DB |
|---|---|---|---|---|
| 6 | B | 0.2% | 92.76 | 5.50 |
| 15 | B | 1% | 83.33 | 6.44 |
| 18 | B | 2% | 77.26 | 8.05 |

Table 2 shows that the gloss decreases with increasing amounts of component I.

We claim:

1. A thermoplastic molding material comprising a mixture of a copolymer I and a copolymer II, copolymer I being a high-impact, graft copolymer which is derived from (a1) a monovinyl-aromatic monomer selected from the group consisting of styrene, p-methylstyrene, αmethylstyrene, 2,4-dimethyl styrene, tert.-butylstyrene and mixture of styrene and p-methyl styrene and (a2) a soft component consisting of monomers a1 grafted onto a polymer or copolymer predominantly containing 1,3-diene units, the mean particle size of said soft component being from 0.3 to 15 μm and the rubber content being from 2 to 18% by weight, based on copolymer I, and copolymer II being a block copolymer with star-shaped branching, having an average of more than 2 branches per molecule and derived from (b1) 55–80% by weight, based on II, of one or more monovinyl-aromatic monomers and (b2) 20–45% by weight, based on II, of a 1,3-diene monomer, the said monomers (b1) and (b2) each constituting a polymer segment, consisting of the particular monomer, in the branches, wherein the mount of the graft polymer I in the molding material is from 0.1 to 1% by weight, based on the weight of I+II.

2. A molding material as claimed in claim 1, which additionally contains polystyrene.

3. A thermoplastic molding material comprising a mixture of one or more copolymers I and one or more copolymers II, copolymer I being a high-impact graft copolymer which is derived from (a1) styrene and (a2) a soft component comprising a crosslinked polymer or copolymer containing more than 60% by weight of butadiene units, and having a particle size of from 0.3 to 15 m, and copolymer II being a radial block copolymer with star-shaped branching, having an average of more than 2 branches per molecule and derived from (b1) 55–80% by weight, based on II, of styrene or p-methylstyrene and (b2) 20–45% by weight, based on II, of a conjugated diene monomer of 4 to 8 carbon atoms, the said monomers (b1) and (b2) each constituting a polymer segment, consisting of the particular monomer, in the branches, wherein the amount of the graft copolymer I in the molding material is from 0.1 to 1% by weight, based on the weight of I+II.

4. A thermoplastic molding material as claimed in claim 3, comprising a mixture of a copolymer I and one or more copolymers II, copolymer I being a high-impact graft copolymer which is derived from (a1) styrene and (a2) a crosslinked butadiene polymer, and copolymer II being a radial block copolymer with star-shaped branching, having an average of more than 2 branches per molecule and derived from (b1) 55–80% by weight, based on II, of styrene and (b2) 20–45% by weight, based on II, of butadiene, the said monomers (b1) and (b2) each constituting a polymer segment, consisting of the particular monomer, in the branches, wherein the amount of the graft copolymer I in the molding material is from 0.1 to 1% by weight, based on the weight of I+II.

5. A molding material as defined in claim 1, wherein the rubber contained in the copolymer I is crosslinked.

6. A molding material as defined in claim 1, wherein at least one additional polymer segment b1, b2 or mixture thereof is present in copolymer II.

7. A molding material as defined in claim 3, wherein at least one additional polymer segment b1, b2 or mixture thereof is present in copolymer II.

8. A molding material as defined in claim 4, wherein at least one additional polymer segment b1, b2 or mixture thereof is present in copolymer II.

* * * * *